United States Patent
Ito

(10) Patent No.: US 10,508,051 B2
(45) Date of Patent: Dec. 17, 2019

(54) LENS FORMING MOLD AND MANUFACTURING METHOD FOR CYLINDRICAL LENS

(71) Applicant: FANUC CORPORATION, Yamanashi (JP)

(72) Inventor: Risa Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 56 days.

(21) Appl. No.: 15/928,177

(22) Filed: Mar. 22, 2018

(65) Prior Publication Data
US 2018/0282198 A1   Oct. 4, 2018

(30) Foreign Application Priority Data
Mar. 30, 2017 (JP) .................. 2017-068203

(51) Int. Cl.
 *C03B 23/03* (2006.01)
(52) U.S. Cl.
 CPC ...... *C03B 23/0302* (2013.01); *C03B 2215/41* (2013.01); *C03B 2215/46* (2013.01)
(58) Field of Classification Search
 CPC ............ C03B 23/03–0307; C03B 11/05
 See application file for complete search history.

(56) References Cited

U.S. PATENT DOCUMENTS

2006/0073626 A1* 4/2006 Shimizu .............. C03B 11/082
438/48

2010/0040821 A1* 2/2010 Shyu ..................... C03B 11/08
428/64.1

(Continued)

FOREIGN PATENT DOCUMENTS

| JP | 2001-097726 A | 4/2001 |
|---|---|---|
| JP | 2004-262681 A | 9/2004 |
| JP | 2004-262685 A | 9/2004 |

(Continued)

OTHER PUBLICATIONS

An Office Action mailed by the Japanese Patent Office dated Jan. 8, 2019, which corresponds to Japanese Patent Application No. 2017-068203 and is related to U.S. Appl. No. 15/928,177; with English translation.

(Continued)

*Primary Examiner* — Lisa L Herring
(74) *Attorney, Agent, or Firm* — Studebaker & Brackett PC

(57) ABSTRACT

There are provided a lens forming mold, and a manufacturing method for a cylindrical lens, with which cylindrical lenses having good mass productivity can be manufactured. A lens forming mold for forming a molding on which a plurality of cylindrical surfaces are arranged in parallel includes: a first mold including a plurality of cylindrical surface forming portions that are arranged in parallel at equal intervals; and a first flat surface forming portion that is provided between adjacent cylindrical surface forming portions; and a second mold that sandwiches the glass material and faces the first mold when the molding is molded, in which the second mold includes a second flat surface forming portion that faces the plurality of cylindrical surface forming portions and the first flat surface forming portion.

7 Claims, 8 Drawing Sheets

(56) References Cited

U.S. PATENT DOCUMENTS

2014/0147633 A1* 5/2014 Ashida .................. C03B 11/082
                                                    428/156
2017/0001896 A1* 1/2017 Nakaya ................ C03B 11/086

FOREIGN PATENT DOCUMENTS

| | | |
|---|---|---|
| JP | 2006-256906 A | 9/2006 |
| JP | 2006-298692 A | 11/2006 |
| JP | 2008-216419 A | 9/2008 |
| JP | 2011-157258 A | 8/2011 |
| JP | 2012-148907 A | 8/2012 |
| WO | 2008/149670 A1 | 12/2008 |

OTHER PUBLICATIONS

An Office Action mailed by the State Intellectual Property Office of the People's Republic of China dated May 21, 2019, which corresponds to Chinese Patent Application No. 201810267078.8 and is related to U.S. Appl. No. 15/928,177.

* cited by examiner

LENS FORMING MOLD AND MANUFACTURING METHOD FOR CYLINDRICAL LENS

This application is based on and claims the benefit of priority from Japanese Patent Application No. 2017-068203, filed on 30 Mar. 2017, the content of which is incorporated herein by reference.

BACKGROUND OF THE INVENTION

Field of the Invention

The present invention relates to a lens forming mold, and a manufacturing method for a cylindrical lens.

Related Art

In a fiber laser that uses an optical fiber as an amplifying medium, light that has been output from a plurality of excitation LDs (semiconductor lasers) is used as excitation light. The light that has been output from the plurality of excitation LDs is rectified and converged by a plurality of cylindrical lenses in order to couple the light to an optical fiber. In the fiber laser, glass lenses are used because rectifying and converging the light that has been output from the excitation LDs requires excellent heat resistance, strength, and refractive index precision. As a manufacturing method for a glass lens, mechanical machining, for example, grinding and polishing, has mainly been used. However, due to a growing number of requests for aspheric lenses, a molding method using a mold press machine that employs a mold has begun to be widely used in recent years.

Cylindrical glass lenses are extremely compact, being only from a few millimeters to a few tens of millimeters in size, so they are difficult to handle. In addition, before mold pressing is performed, glass material must be placed in the molds one by one, and press moldings after pressing must be picked, and these tasks require a large number of man-hours when glass cylindrical lenses are mass-produced.

Conventionally, in terms of lens manufacturing methods, there is known a technology of manufacturing a plurality of lenses by using a lower mold and an upper mold that each have a cylindrical surface forming portion, to thereby manufacture press moldings and cut the manufactured press moldings (see, for example, Patent Document 1). In addition, as a lens manufacturing method, there is also known a technology of manufacturing lenses one by one by forming one optical surface into a cylindrical surface, and forming another optical surface into a flat surface, and cutting off excess portions (see, for example, Patent Document 2).

Patent Document 1: Japanese Unexamined Patent Application, Publication No. 2006-298692
Patent Document 2: Japanese Unexamined Patent Application, Publication No. 2008-216419

SUMMARY OF THE INVENTION

In the technology disclosed in Patent Document 1, because the upper mold and lower mold have the cylindrical surface forming portions, it is necessary to center (align the centers of) these molds when manufacturing the press molding. Therefore, manufacturing of the press molding is a complicated task. Likewise, in the technology disclosed in Patent Document 2, because the lenses are manufactured one by one, the press moldings must be removed after pressing when manufacturing a plurality of lenses, and this task requires a large number of man-hours when the lenses are mass-produced.

It is an object of the present invention to provide a lens forming mold, and a manufacturing method for a cylindrical lens, with which cylindrical lenses having good mass productivity can be manufactured.

(1) The present invention relates to a lens forming mold (for example, a lens forming mold 1 to be described later) for forming, from a glass material (for example, a glass material 100 to be described later), a molding (for example, a press molding 200 to be described later) on which a plurality of cylindrical surfaces (for example, a cylindrical surface 224 to be described later) are arranged in parallel, the lens forming mold including: a first mold (for example, a lower mold 2 to be described later) including a plurality of cylindrical surface forming portions (for example, cylindrical surface forming portions 24 to be described later) that are arranged in parallel at equal intervals; and a first flat surface forming portion that is provided between adjacent cylindrical surface forming portions; and a second mold (for example, an upper mold 3 to be described later) including a second flat surface forming portion (for example, an upper mold lower surface portion 33 to be described later) that sandwiches the glass material and faces the cylindrical surface forming portions and the first flat surface forming portion (for example, an inter-curved-surface flat surface forming portion 25 to be described later) of the first mold when the molding is molded.

(2) In the lens forming mold according to (1), it is preferred that each of the cylindrical surface forming portions of the first mold be configured of a spherical surface or a free-form surface, and that top portions (for example, a top portion 24a to be described later) of each of the cylindrical surface forming portions be positioned on the same flat plane at the same height.

(3) In the lens forming mold according to (1) or (2), it is preferred that the first mold and the second mold are each formed into a cylindrical shape that has a circular molding surface, or a square column shape that has a quadrangular molding surface.

(4) In the lens forming mold according to any one of (1) to (3), it is preferred that the first flat surface forming portion has a width that is equal to or larger than a thickness of a blade of a cutting tool that cuts the molding, and that, on each end of the first mold, there is provided a mark forming portion (for example, a mark forming recess portion 27 to be described later) for forming, on the molding, a mark (for example, a mark protrusion 227 to be described later) that is used as a guide for positioning when cutting the molding with the cutting tool.

(5) The present invention relates to a manufacturing method for a cylindrical lenses for manufacturing a plurality of cylindrical lenses (for example, the cylindrical lenses 300) using the lens forming mold according to any one of (1) to (4), in which the method includes a step of placing a glass material on the first mold and joining the first mold and a second mold to thereby form, without performing centering, a molding on which a plurality of cylindrical surfaces are arranged in parallel; and a step of cutting the molding with the cutting tool in two directions, a direction in which the plurality of cylindrical surfaces are arranged, and a direction that intersects with the direction in which the plurality of cylindrical surfaces are arranged, to thereby obtain the plurality of cylindrical lenses from one molding.

(6) In the manufacturing method for cylindrical lenses according to (5), it is preferred that the manufacturing method uses a first fixture (for example, a lower fixture 4 to be described later) with which it is possible to mount a plurality of the first molds in a symmetrical manner, and a second fixture (for example, an upper fixture 5 to be described later) with which it is possible to mount a plurality of the second molds in a symmetrical manner, and the manufacturing method further includes a step of making mounting positions of the first fixture and the second fixture coincide, so that the respective positions of each of the plurality of first molds and the plurality of second molds coincide, to thereby, during one-press molding, form a plurality of moldings using a plurality of lens forming molds.

(7) In the manufacturing method for cylindrical lenses according to (5) or (6), it is preferred that the glass material be formed into a circular or quadrangular plate shape, and include a protrusion (for example, a convex portion 101 to be described later) that corresponds to a shape of the cylindrical surface forming portion of the first mold.

(8) In the manufacturing method for cylindrical lenses according to any one of (5) to (7), it is preferred that the glass material be formed into a circular or quadrangular plate shape, and comprise one or more holes (for example, a hole 111 or holes 121 to be described later) or a vortex structure.

(9) In the manufacturing method for cylindrical lenses according to any one of (5) to (8), it is preferred that the glass material have a diameter equal to or larger than a distance between both ends of the cylindrical surface forming portion; a surface area equal to or less than a surface area of the first mold; a volume equal to or less than a volume of an intended molding; and a thickness equal to or less than a thickness of the intended molding, and the glass material be formed so as to not protrude from the first mold and the second mold when the first mold and the second mold are joined.

According to the present invention, there can be provided a lens forming mold, and a manufacturing method for a cylindrical lens, with which cylindrical lenses having good mass productivity can be manufactured.

DETAILED DESCRIPTION OF THE INVENTION

First Embodiment

Figure 1A:
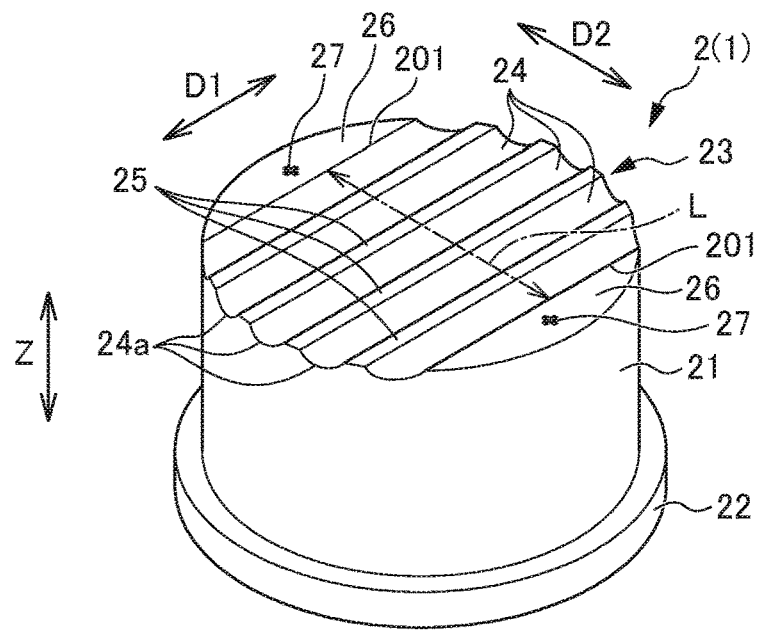
FIG. 1A is a perspective view for illustrating a lower mold in a mold for molding a lens according to a first embodiment of the present invention.
Figure 1B:
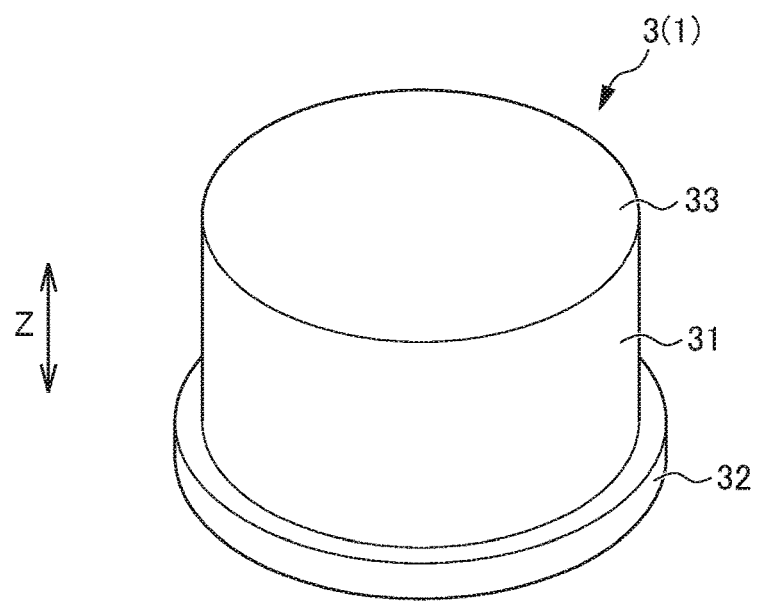
FIG. 1B is a perspective view for illustrating an upper mold in the mold for molding a lens according to the first embodiment of the present invention.
Figure 2:
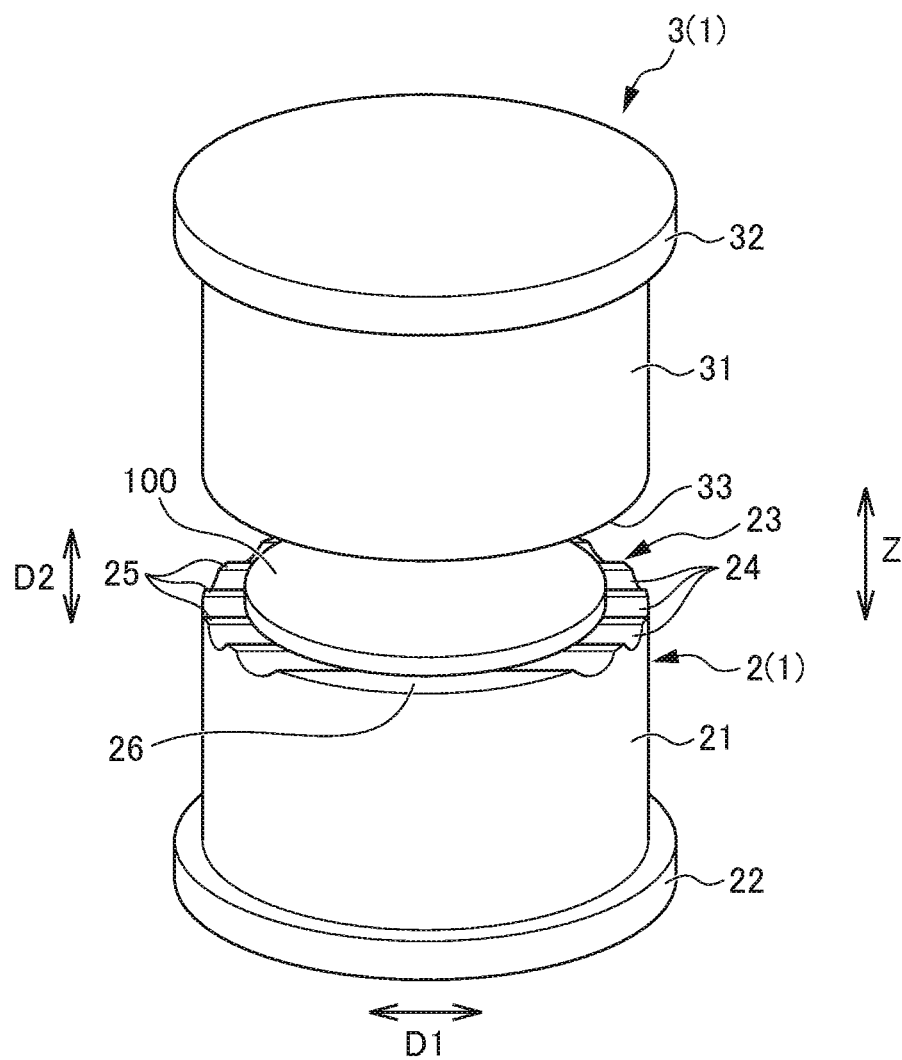
FIG. 2 is a perspective view for illustrating a state in which a glass material has been placed on the lower mold, and the upper mold is arranged so as to face the lower mold.
Figure 3:
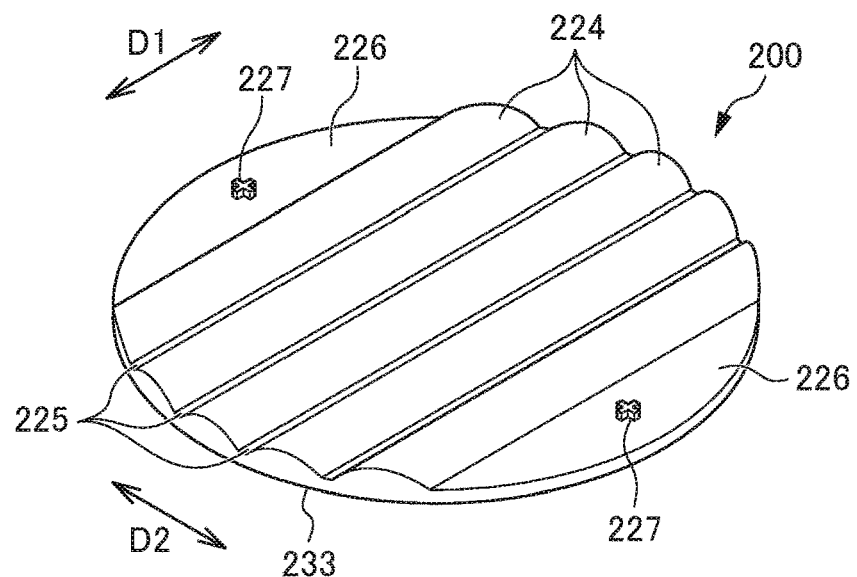
FIG. 3 is a perspective view for illustrating a press molding that is formed by being pressed by the lower mold and the upper mold.
Figure 4:
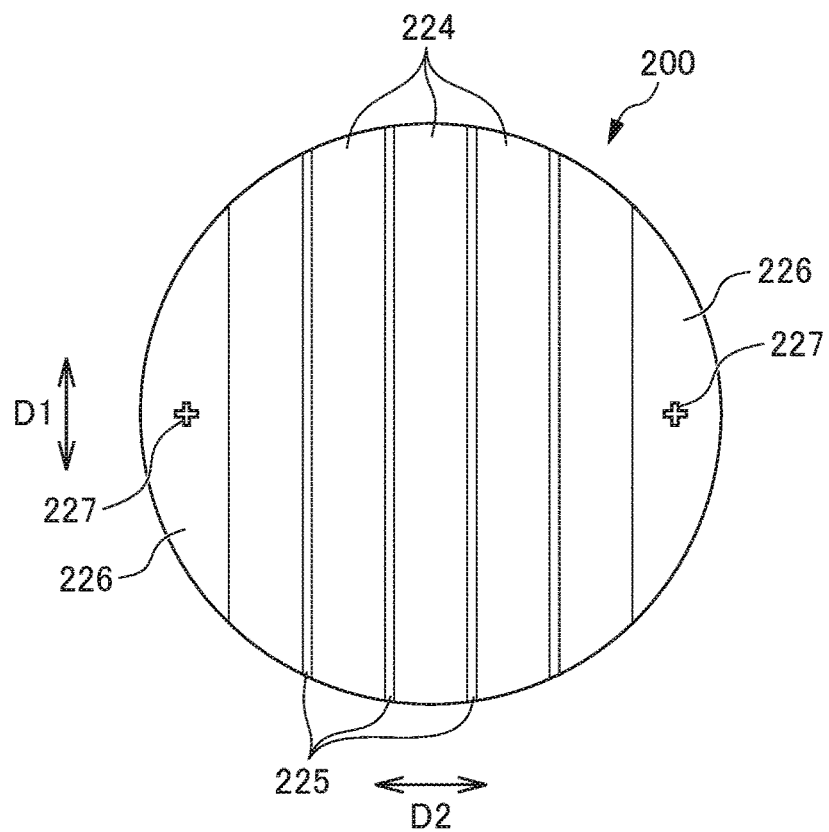
FIG. 4 is a planar view for illustrating the press molding that is formed with the lower mold and the upper mold.
Figure 5:
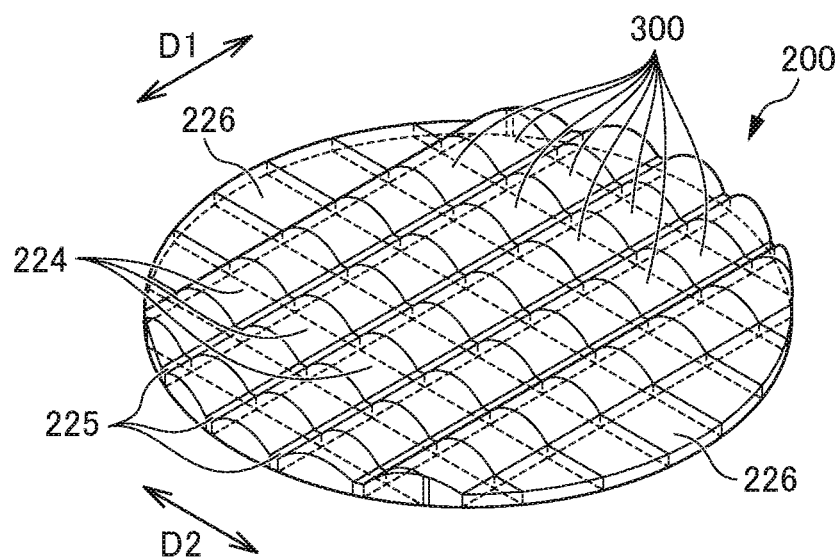
FIG. 5 is a perspective view for illustrating a state in which the press molding is cut into a plurality of cylindrical lenses.

Herein, a first embodiment of the present invention is described with reference to the drawings. FIG. 1A is a perspective view for illustrating a lower mold 2 in a lens forming mold 1 according to the first embodiment of the present invention. FIG. 1B is a perspective view for illustrating an upper mold 3 in the lens forming mold 1 according to the first embodiment of the present invention. FIG. 2 is a perspective view for illustrating a state in which a glass material 100 has been placed on the lower mold 2, and the upper mold 3 is arranged so as to face the lower mold 2. FIG. 3 is a perspective view for illustrating a press molding 200 that is formed by being pressed by the lower mold 2 and the upper mold 3. FIG. 4 is a planar view for illustrating the press molding 200 that is formed with the lower mold 2 and the upper mold 3. FIG. 5 is a perspective view for illustrating a state in which the press molding 200 is cut into a plurality of cylindrical lenses 300.

The lens forming mold 1 according to this embodiment is used when manufacturing a plurality of cylindrical lenses 300 (see FIG. 5). The plurality of cylindrical lenses 300 each have curved cylindrical surfaces 224 (see FIG. 5), and rectify or converge light in order to couple light that has been output from a plurality of excitation LDs (semiconductor lasers) to an optical fiber. Glass lenses are used for the cylindrical lenses 300 because rectifying and converging the light that has been output from the excitation LDs requires excellent heat resistance, strength, and refractive index precision.

As illustrated in FIGS. 1A to 2, the lens forming mold 1 according to the present invention includes the lower mold 2 as a first mold, and the upper mold 3 as a second mold. As illustrated in FIG. 2, in the lens forming mold 1, the glass material 100 is placed between the lower mold 2 and the upper mold 3 and is heated, to thereby, as illustrated in FIGS. 3 and 4, use the lens forming mold 1 to form a press molding 200 on which a plurality of cylindrical surfaces 224 are arranged in parallel from a glass material 100. By cutting the press molding 200 manufactured using the lens forming mold 1 with a cutting tool (not shown) such as a dicer or a slicer, as illustrated in FIG. 5, the plurality of cylindrical lenses 300 can be obtained.

As illustrated in FIGS. 1A to 2, the lower mold 2 and the upper mold 3 are each formed into a cylindrical shape that has a circular molding surface. The shape of the lower mold 2 and the upper mold 3 is not limited to the above-described example, and may be, for example, a square column that has a quadrangular molding surface.

As illustrated in FIG. 1A, the lower mold 2 includes a cylindrical lower mold body portion 21, a lower mold flange portion 22, and a lower mold upper forming surface portion 23. The lower mold body portion 21 is formed into a cylindrical shape that has a circular mold surface. The lower mold flange portion 22 is formed into a disc shape that protrudes outward in a radial direction of the lower mold body portion 21 on a lower edge portion of the lower mold body portion 21.

The lower mold upper forming surface portion 23 arranged so as to face an upper mold lower surface portion 33 (to be described later, see FIG. 1B and FIG. 2) of the upper mold 3 when the press molding 200 is molded (formed). The lower mold upper forming surface portion 23 includes a plurality of cylindrical surface forming portions 24, a plurality of inter-curved-surface flat surface portions 25 (first flat surface forming portions), and a pair of end portion forming portions 26.

The plurality of cylindrical surface forming portions 24 form the plurality of cylindrical surfaces 224 in the press molding 200 when the press molding 200 is molded (see FIGS. 3 and 4). The plurality of cylindrical surface forming portions 24 are formed in the lower mold upper portion forming surface portion 23 so as to extend in a first direction D1, and are arranged in parallel in a second direction D2 at equal intervals. In this embodiment, the first direction D1 and the second direction D2 are perpendicular to each other. In this embodiment, the direction in which the cylindrical surface forming portions 24 extend is referred to as the first direction D1, and the direction in which the plurality of cylindrical surface forming portions 24 are arranged is referred to as the second direction D2.

As illustrated in FIG. 1A, the cylindrical surface forming portions 24 are formed into recessed curved surfaces on an upper surface of the lower mold 2. For example, the cylindrical surface forming portions 24 are configured of any type of curved surface, such as a spherical surface or a free-form surface. In this embodiment, the plurality of cylindrical surface forming portions 24 are each formed into the same shape. In addition, top portions 24a of each of the cylindrical surface forming portions 24 are formed at the same height and on the same plane as the plurality of inter-curved-surface flat surface portions 25 (described later), so as to make their height the same. In this embodiment, it has been described that the cylindrical surface forming portions 24 are formed into the same shape, but the cylindrical surface forming portions 24 are not limited thereto, and may be formed into curved surfaces that have different shapes.

The plurality of inter-curved-surface flat surface portions 25 form a plurality of inter-curved-surface flat surfaces 225 in the press molding 200 when the press molding 200 is molded (see FIGS. 3 and 4). The plurality of inter-curved-surface flat plane portions 25 are formed between adjacent cylindrical surface forming portions 24. The inter-curved-surface flat surface portions 25 are formed into flat plane shapes, and extend in the first direction D1.

As illustrated in FIG. 5, the inter-curved-surface flat surfaces 225 that are formed by the inter-curved-surface flat surface portions 25 are parts that are cut by a cutting tool (not shown) such as a dicer or a slicer when the plurality of cylindrical lenses 300 are manufactured from the press molding 200. The inter-curved-surface flat surface portions 25 and the inter-curved-surface flat surfaces 225 are formed so as to have a width that is equal to or larger than the thickness of the blade of the cutting tool (not shown), such as the dicer or the slicer, that is used to cut the press molding 200.

As illustrated in FIG. 1A, the pair of end portion forming portions 26 are formed at both ends of the lower mold upper portion forming portion 23 of the lower mold 2 in the second direction D2. The end portion forming portions 26 are flat surfaces, and are each formed into a crescent shape that has an arc portion when viewed in a planar view. The end portion forming portions 26 form end portion flat surfaces 226 of the press molding 200 when the press molding 200 is molded (see FIGS. 3 and 4). The end portion flat surfaces 226 are portions that are cut out with a cutting tool and discarded when the plurality of cylindrical lenses 300 are manufactured from the press molding 200.

As illustrated in FIG. 1A, a mark forming recess portion 27 (mark forming portion) is formed on upper surfaces of the end portion forming portions 26. The mark forming recess portion 27 transfers a mark protrusion 227 (see FIG. 3), which is a mark used as a guide for positioning during cutting, onto the press molding 200 when the press molding 200 is cut with the cutting tool. In this embodiment, the mark forming recess portion 27 is formed into a recessed cross. However, the shape of the mark forming recess portion 27 is not limited thereto. For example, the shape of the mark forming recess portion 27 may be a dot or a line. By forming the mark forming recess portion 27 with a size of, for example, 1 mm or less, and a depth of 0.5 mm or less, cracks that originate from mark protrusions 227 (see FIG. 3) can be prevented from occurring when the press molding 200 is molded.

The upper mold 3 is arranged so as to sandwich the glass material 100 and face the lower mold 2 when the press molding 200 is molded. As illustrated in FIG. 1B, the upper mold 3 includes a cylindrical upper mold body portion 31, an upper mold flange portion 32, and an upper mold lower surface portion 33 (second flat surface forming portion). The upper mold body portion 31 is formed into a cylindrical shape that has a circular mold surface. The upper mold flange portion 32 is formed into a disc shape that protrudes outward in a radial direction of the upper mold body portion 31 on an upper edge portion of the upper mold body portion 31. The upper mold lower surface portion 33 is formed into a flat plate that covers the entire lower surface of the upper mold 3.

As illustrated in FIG. 2, the upper mold lower surface portion 33 is arranged so as to face the plurality of cylindrical surface forming portions 24 and the plurality of inter-curved-surface flat surface forming portions 25 on the lower mold upper forming surface portion 23 of the lower mold 2 when the press molding 200 is molded. As illustrated in FIG. 3, the upper mold lower surface portion 33 forms a flat surface 233 on the press molding 200 when the press molding 200 is molded. The flat surface 233 is formed on a side opposite to one side of the press molding 200 on which the plurality of cylindrical surfaces 224 and the plurality of inter-curved-surface flat surfaces 225 are formed.

When manufacturing the press molding 200 (see FIG. 3) using the lower mold 2 and the upper mold 3, as illustrated in FIG. 2, the glass material 100 is placed on the lower mold 2, and the upper mold 3 is arranged so as to sandwich the glass material 100 and face the lower mold 2. Then, the glass material 100 is heated, and the lower mold 2 and the upper mold 3 are joined, to thereby press the glass material 100 and mold the press molding 200, on one side of which the plurality of cylindrical surfaces 224 are arranged in parallel, without performing centering (molding forming step). The thickness of the press molding 200 can be controlled by adjusting the distance between the lower mold 2 and the upper mold 3.

In this embodiment, as illustrated in FIG. 2, a plate-shaped material that is formed into a circular shape when viewed in a planar view, and that has flat upper and lower surfaces is used as the glass material 100. The glass material 100 is, for example, formed of a glass material that has a glass transition point of 620 degrees C. or lower, and molded at a molding temperature that is higher than the glass transition point.

The glass material 100 has, for example, a diameter equal to or larger than a distance L (see FIG. 1A), which is a distance between both ends 201 of the cylindrical surface forming portion 24, a surface area equal to or less than the surface area of the lower mold 2, a volume equal to or less than the volume of the intended press molding 200, and a thickness equal to or less than the thickness of the intended press molding 200. In addition, the glass material 100 is formed so as to not protrude from the lower mold 2 and the upper mold 3 when the lower mold 2 and the upper mold 3 are joined. With this configuration, by using a glass material 100 that has an appropriate thickness and diameter, the number of cavities for the cylindrical lenses 300 can be guaranteed, and any glass material 100 that protrudes from the lower mold 2 and the upper mold 3 can be prevented from adhering to the lower mold 2 and the upper mold 3. In addition, by making the thickness of the glass material 100 thinner than the intended thickness of the press molding 200, the glass material 100 can enter the concave cylindrical surface forming portions 24 in the lower mold 2 more easily when the mold is pressed, molding time can be shortened, and stress can be reduced.

As illustrated in FIG. 3, on one side of the press molding 200 formed from the glass material 100, there is formed the plurality of cylindrical surfaces 224 that extend in the first direction D1 and are arranged in the second direction D2, the plurality of inter-curved-surface flat surfaces 225 that are formed between the adjacent cylindrical surfaces 224, and the pair of end portion flat surfaces 226. On another side of the press molding 200, there is formed the flat surfaces 233. The cylindrical surfaces 224 are each formed so as to protrude as a curved surface. The inter-curved-surface flat surfaces 225 are each formed into a flat surface between the adjacent cylindrical surfaces 224, and have a width that is equal to or more than the thickness of the blade of the cutting tool (not shown).

As described above, as illustrated in FIGS. 1B and 2, the flat upper mold lower surface portion 33 is formed on a lower surface of the upper mold 3 that is used when molding the press molding 200. Therefore, a press molding 200 on which the plurality of cylindrical surfaces 224 are arranged in parallel on one side of the press molding 200 can be formed without performing centering (aligning of centers).

As described above, the plurality of cylindrical lenses 300 can be manufactured by cutting the molded press molding 200 with the cutting tool (not shown), such as a dicer or a slicer. More specifically, as illustrated in FIG. 5, the press molding 200 is cut with the cutting tool, such as the dicer or the slicer, in two directions, that is, the first direction D1 (the direction that intersects with the plurality of cylindrical surfaces 224) and the second direction D2 (the direction in which the plurality of cylindrical surfaces 224 are arranged), to thereby manufacture (obtain) the plurality of cylindrical lenses 300 from one press molding 200. When the press molding 200 is cut in the two directions, the blade of the cutting tool cuts along the first direction D1, in which the inter-curved-surface flat surfaces 225 that are formed between the adjacent cylindrical surfaces 224 extend, and cuts along the second direction D2 in which the plurality of cylindrical surfaces 224 are arranged.

In this embodiment, the glass material 100 is formed into a circular shape that has flat upper and lower surfaces, but the glass material 100 is not limited thereto. For example, the glass material 100 may be formed into a plate shape that has an outer shape formed into a circular or rectangular shape. With this configuration, the number of cavities of the cylindrical lenses 300 in one press molding 200 can be increased by forming the glass material into the plate shape that has an outer shape formed into a circular or rectangular shape.

Figure 6:
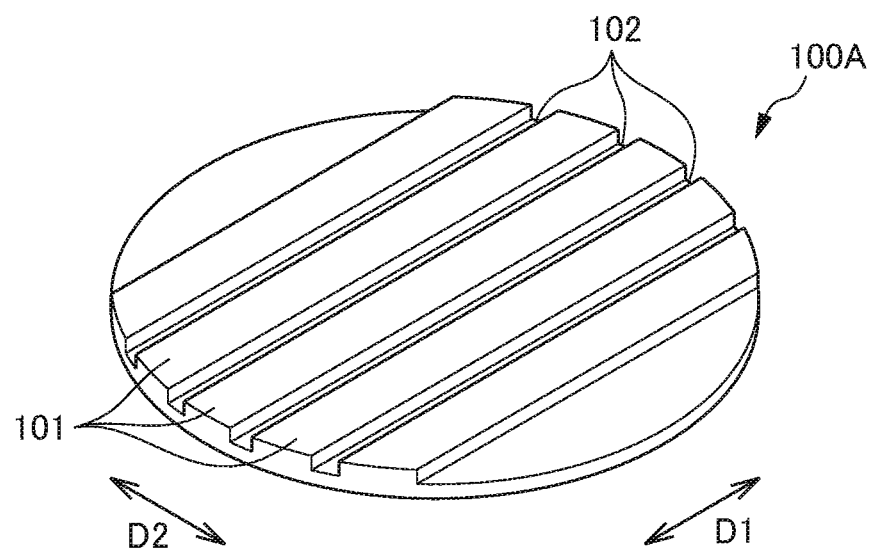
FIG. 6 is a perspective view for illustrating a glass material that has a plurality of convex portions that correspond to a shape of a cylindrical surface forming portion of the lower mold.
Figure 7A:
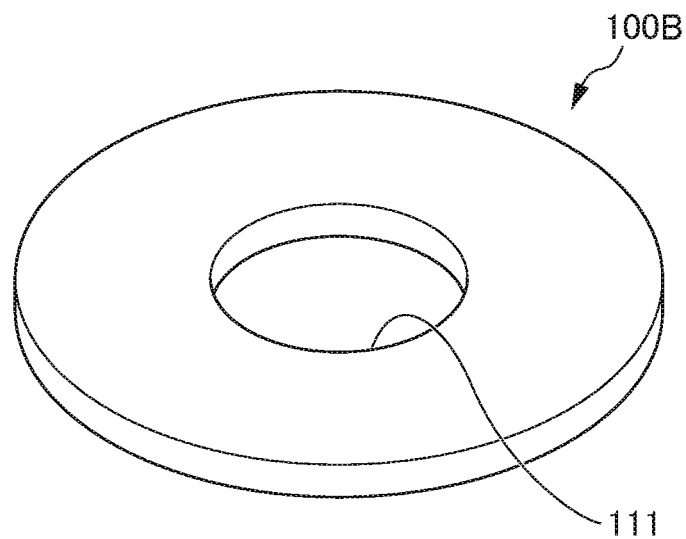
FIG. 7A is a perspective view for illustrating a disc-shaped glass material that is provided with one hole in its center.
Figure 7B:
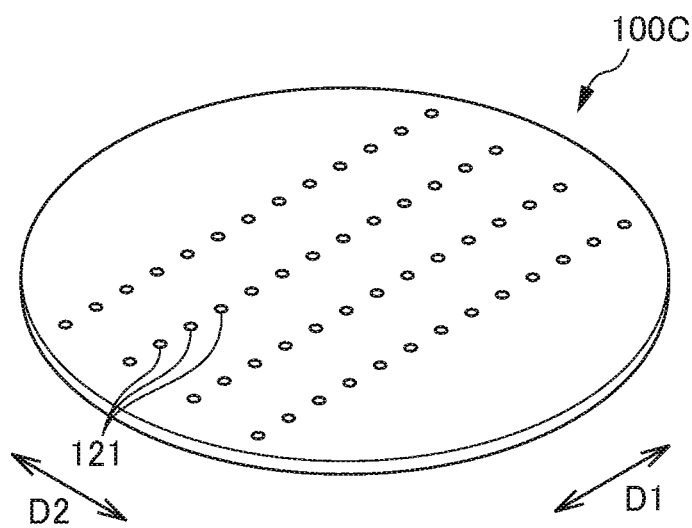
FIG. 7B is a perspective view for illustrating a disc-shaped glass material that is provided with a plurality of holes.
Figure 7C:
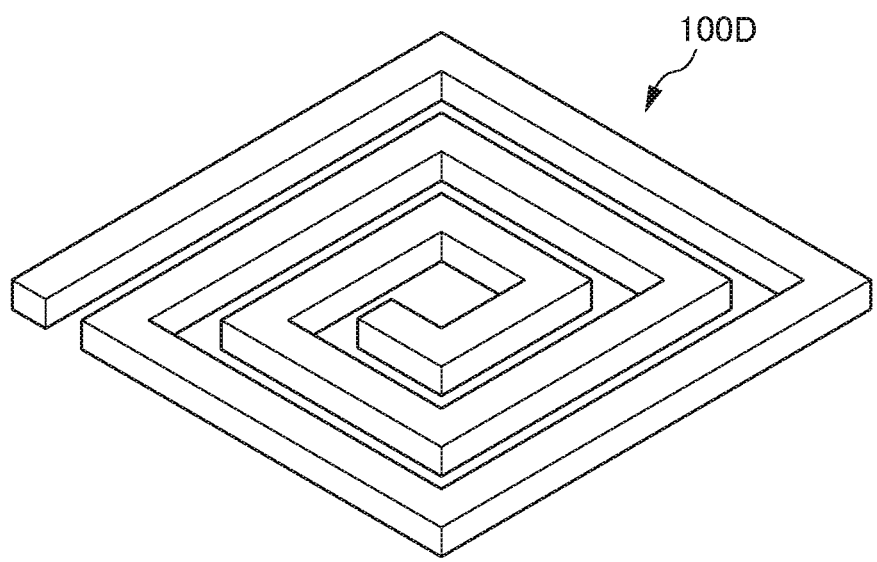
FIG. 7C is a perspective view for illustrating a glass material that has a vortex structure.

For example, the glass material can be formed in the following way. FIG. 6 is a perspective view for illustrating a glass material 100A that has a plurality of convex portions 101 that correspond to the shape of the cylindrical surface forming portion 24 of the lower mold 2. FIG. 7A is a perspective view for illustrating a disc-shaped glass material 100B that is provided with one hole 111 in its center. FIG. 7B is a perspective view for illustrating a disc-shaped glass material 100C that is provided with a plurality of holes 121. FIG. 7C is a perspective view for illustrating a glass material 100D that has a vortex structure.

For example, as illustrated in FIG. 6, the glass material 100A can be formed into a shape that includes the plurality of convex portions 101 (protrusions) that correspond to the shape of the plurality of cylindrical surface forming portions 24 (See FIG. 1A) in the lower mold 2. The glass material 100A includes the plurality of convex portions 101 that extend in the first direction D1, and a plurality of recessed groove portions 102 that are formed so as to extend in the first direction D1 between the adjacent convex portions 101. When the press molding 200 is molded, the plurality of convex portions 101 are arranged so as to face the lower mold 2, and face the plurality of cylindrical surface forming portions 24. With this configuration, the heated glass material 100A enters the cylindrical surface forming portions 24 in the lower mold 2 more easily when the press molding 200 is molded. Therefore, because the glass material 100A includes the convex portions 101 that correspond to the shape of the cylindrical surface forming portion 24 in the lower mold 2, the glass material 100A can be more easily filled into the lower mold 2, molding time can be shortened, and stress can be reduced.

In addition, as illustrated in FIGS. 7A to 7C, the glass materials 100B, 100C, and 100D can be formed of a plate-shaped material that has a space inside. For example, as illustrated in FIG. 7A, the glass material 100B can be formed into a plate having one hole 111 in the middle thereof. The hole 111 in the glass material 100B forms a space inside the glass material 100B. In addition, as illustrated in FIG. 7B, the glass material 100C can be formed into a plate having a plurality of holes 121. The plurality of holes 121 in the glass material 100C are arranged linearly in the first direction D1, and arrayed in the second direction D2. The plurality of holes 121 in the glass material 100C form spaces inside the glass material 100C. In addition, as illustrated in FIG. 7C, the glass material 100D can be formed into a plate that has a vortex structure that swirls from the center outward at right angles. The gaps between the swirls of the vortex in the glass material 100D form spaces inside the glass material 100D.

As described above, by forming the glass materials 100B, 100C, and 100D into the shapes with spaces as illustrated in FIGS. 7A to 7C, there can be formed a space to which the glass materials 100B, 100C, and 100D escape when the glass materials 100B, 100C, and 100D are melted when the press molding 200 is molded. Therefore, excess stress can be prevented from acting on the glass materials 100B, 100C, and 100D.

According to the lens forming mold 1 according to the first embodiment having the above-mentioned configuration, the following effects can be achieved. In this embodiment, the lens forming mold 1 is configured of the lower mold 2, which includes the plurality of cylindrical surface forming portions 24 that are arranged in parallel at equal intervals, and the inter-curved-surface flat surface forming portions 25 that are provided between the adjacent cylindrical surface forming portions 24; and the upper mold 3, which includes the upper mold lower surface portion 33 that sandwiches the glass material 100 and faces the cylindrical surface forming portions 24 and the inter-curved-surface flat surface forming portions 25 of the lower mold 2 when the press molding 200 is molded.

With this configuration, because the upper mold 3 includes the flat upper mold lower surface portion 33, there is no need to perform centering (aligning of centers) when manufacturing the press molding 200. Therefore, work can be made easier when manufacturing the press molding 200. In addition, because a plurality of cylindrical lenses 300 can be manufactured, cylindrical lenses 300 having good mass productivity can be manufactured.

In addition, in this embodiment, the cylindrical surface forming portions 24 of the lower mold 2 are configured of a freely curved surface, such as a spherical surface or a free-form surface. Therefore, a plurality of cylindrical lenses 300 having freely curved surfaces can be manufactured from one press molding 200. In addition, the top portions 24a of each of the cylindrical surface forming portions 24 are positioned on the same flat plane at the same height. With this configuration, the top portions 24a of each of the cylindrical surface forming portions 24 are formed so as to be positioned on the same flat plane at the same height when the cylindrical surface forming portions 24 are formed of surfaces curved in different ways. Therefore, a plurality of cylindrical lenses 300 having different surfaces can be easily manufactured from one press molding 200.

In this embodiment, the lower mold 2 and the upper mold 3 are each formed into a cylindrical shape that has a circular mold surface, or a square column that has a quadrangular molding surface. Therefore, the number of cavities for the cylindrical lenses 300 in one press molding 200 can be increased.

In addition, in this embodiment, the inter-curved-surface flat surface portions 25 have a width that is equal to or larger than the thickness of the blade of the cutting tool that cuts the press molding 200, and both edges of the lower mold 2 are provided with the mark forming recess portions 27 that are used to form the mark protrusions 227 that will become marks for positioning the press molding 200 when the press molding 200 is cut with the cutting tool. With this configuration, in the inter-curved-surface flat surfaces 225 that are formed by the inter-curved-surface flat surface forming portions 25, the press molding 200 can be easily cut with the blade of the cutting tool. Therefore, after the press molding 200 is cut with the cutting tool, the cylindrical lenses 300 having the intended shape can be obtained.

A manufacturing method for a cylindrical lens according to this embodiment is a manufacturing method for manufacturing the plurality of cylindrical lenses 300 using the lens forming mold 1, the method including a step of placing the glass material 100 on the lower mold 2, and joining the lower mold 2 and the upper mold 3, to thereby mold the press molding 200 having the plurality of cylindrical surfaces 224 arranged in parallel on one surface thereof; and a step of cutting the press molding 200 with the cutting tool in the two directions of the second direction D2, which is the direction in which the plurality of cylindrical surfaces 224 are arranged, and the first direction D1 that intersects with the direction in which the plurality of cylindrical surfaces 224 are arranged, to thereby obtain the plurality of cylindrical lenses 300 from one press molding 200. With this configuration, because the upper mold 3 includes the upper mold lower surface portion 33, there is no need to perform centering (aligning of centers) when manufacturing the press molding 200. Therefore, the task of manufacturing the press molding 200 can be simplified. In addition, because a plurality of cylindrical lenses 300 can be manufactured, cylindrical lenses 300 having good mass productivity can be manufactured.

Further, in this embodiment, the glass material 100A is formed into a circular or rectangular plate shape, and includes the convex portions 101 that correspond to the shapes of the cylindrical surface forming portions 24 in the lower mold 2. With this configuration, the glass material 100A is formed into the circular or rectangular plate shape so that the glass material 100A evenly spreads out, and is more easily filled into the lower mold 2. Therefore, the number of cavities of the cylindrical lens 300 per press molding 200 can be increased. In addition, because the glass material 100A includes the convex portions 101 that correspond to the shape of the cylindrical surface forming portion 24 in the lower mold 2, the glass material 100A can be more easily filled into the lower mold 2, molding time can be shortened, and stress can be reduced.

In this embodiment, the glass material 100B, 100C, or 100D is formed into the circular or quadrangular plate shape, and has one or more holes 111 or 121 or a vortex structure. With this configuration, the glass material 100B, 100C, or 100D is formed into the circular or rectangular plate shape so that the glass material 100B, 100C, or 100D evenly spreads out, and is more easily filled into the lower mold 2. Therefore, the number of cavities for the cylindrical lenses 300 per press molding 200 can be increased. In addition, by providing the glass material 100B, 100C, or 100D with a space, there is provided a space to which the glass material 100B, 100C, or 100D escapes when the glass material 100B, 100C, or 100D is melted when the press molding 200 is molded. Therefore, excess stress can be prevented from acting on the glass material 100B or 100C.

In this embodiment, the glass material 100 has a diameter equal to or larger than the distance L, which is the distance between both ends 201 of the cylindrical surface forming portion 24, a surface area equal to or less than the surface area of the lower mold 2, a volume equal to or less than the volume of the intended press molding 200, and a thickness equal to or less than the thickness of the intended press molding 200, and the glass material 100 is formed so as to not protrude from the lower mold 2 and the upper mold 3 when the lower mold 2 and the upper mold 3 are joined. With this configuration, by using a glass material 100 that has an appropriate thickness and diameter, the number of cavities for the cylindrical lenses 300 can be guaranteed, and any glass material 100 that protrudes from the lower mold 2 and the upper mold 3 can be prevented from adhering to the lower mold 2 and the upper mold 3. In addition, by making the thickness of the glass material 100 thinner than the intended thickness of the press molding 200, the glass material 100 enters the concave cylindrical surface forming portions 24 in the lower mold 2 more easily when the mold is pressed, molding time can be shortened, and stress can be reduced.

Second Embodiment

Figure 8A:
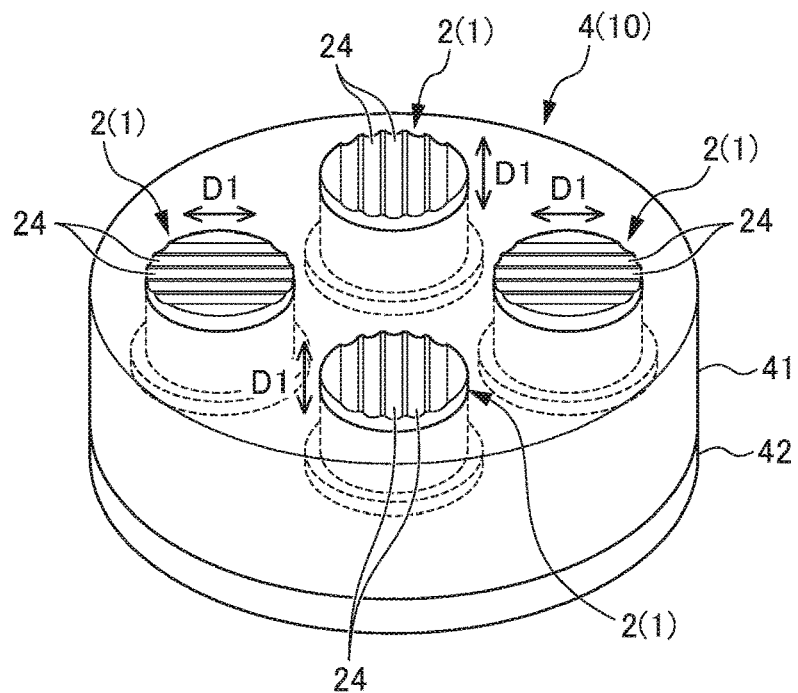
FIG. 8A is a perspective view for illustrating a state according to a second embodiment of the present invention, in which a plurality of the lower molds are mounted to a lower fixture.
Figure 8B:
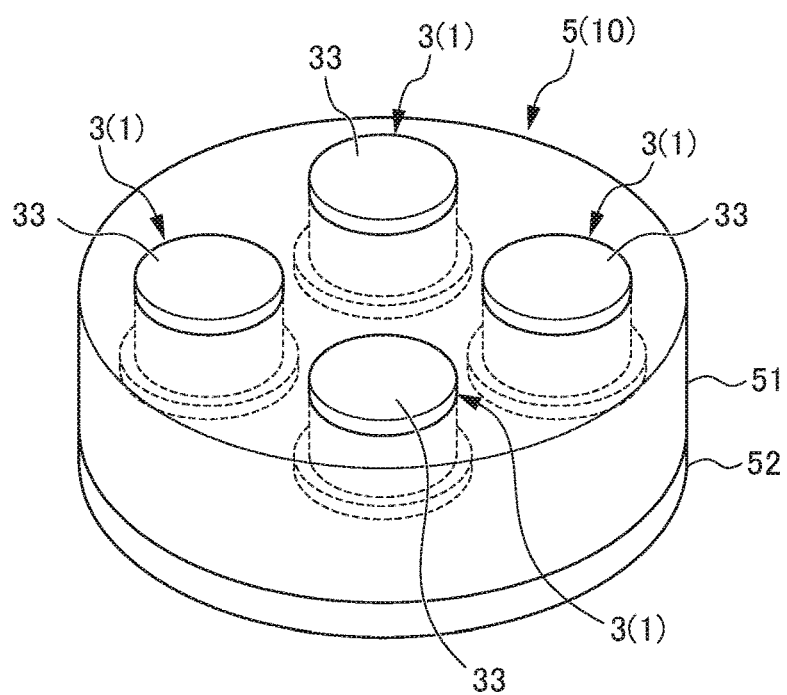
FIG. 8B is a perspective view for illustrating a state according to the second embodiment of the present invention, in which a plurality of the upper molds are mounted to an upper fixture.
Figure 9:
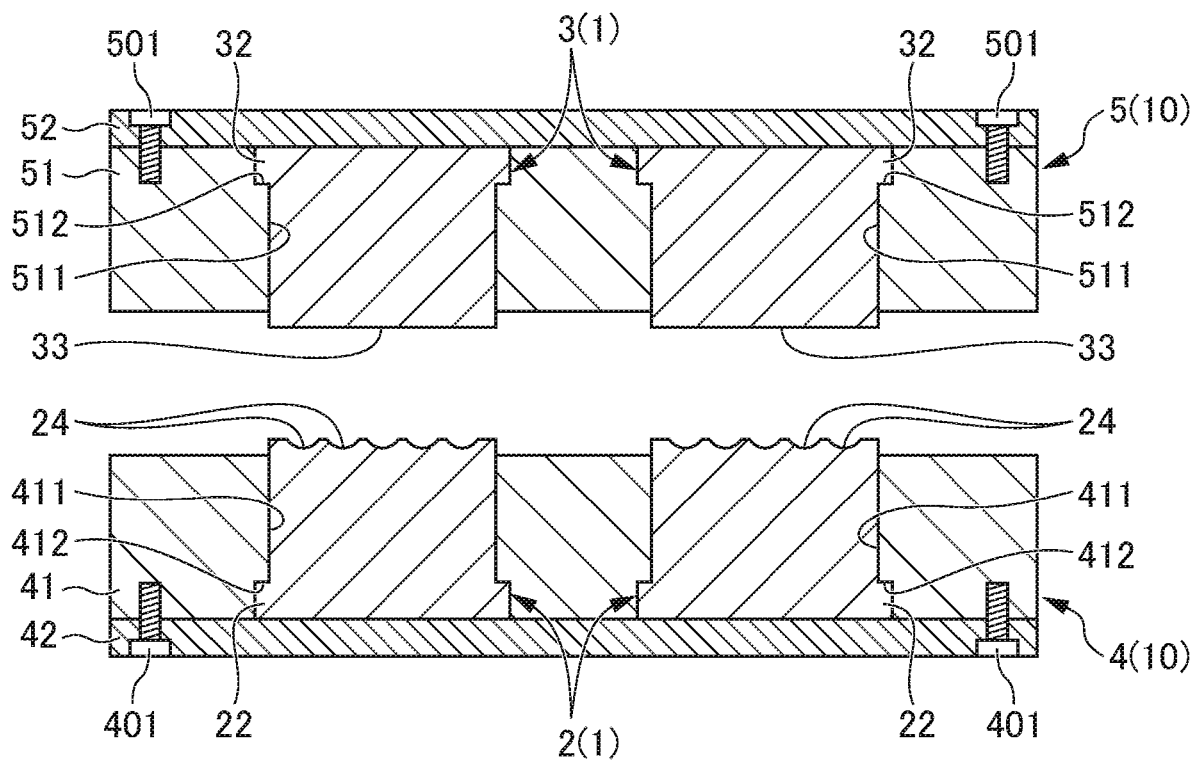
FIG. 9 is a cross-sectional view for illustrating a state in which the lower fixture and the upper fixture are arranged so as to face each other.

A second embodiment of the present invention describes a method of manufacturing a plurality of the press moldings 200 using the molding fixture 10 that holds the lens forming mold 1 according to the first embodiment. FIG. 8A is a perspective view for illustrating a state according to the second embodiment of the present invention, in which a plurality of the lower molds 2 are mounted to a lower fixture 4. FIG. 8B is a perspective view for illustrating a state according to the second embodiment of the present invention, in which a plurality of the upper molds 3 are mounted to an upper fixture 5. FIG. 9 is a cross-sectional view for illustrating a state in which the lower fixture 4 and the upper fixture 5 are arranged so as to face each other.

In the second embodiment, as illustrated in FIGS. 8A to 9, a molding fixture 10 that holds the lens forming mold 1 according to the first embodiment is added. The molding fixture 10 includes the lower fixture 4 that holds the plurality of lower molds 2, and the upper fixture 5 that holds the plurality of upper molds 3. The lower fixture 4 and the upper fixture 5 are arranged so as to face each other in a state in which the plurality of lower fixtures 2 and the plurality of upper fixtures 3 face each other. Each of the lower molds 2 and the upper molds 3 according to the second embodiment have the same configuration as the lower mold 2 and the upper mold 3 according to the first embodiment.

As illustrated in FIG. 8A, it is possible to mount a plurality of the lower molds 2 on the lower fixture 4 in a symmetrical manner. In this embodiment, four lower molds 2 are mounted to the lower fixture 4. The lower fixture 4 includes a lower fixture body 41, and a lower fixture fixing plate 42. The plurality of lower molds 2 arranged on the lower fixture 4 are arranged on the lower fixture 4 so that the cylindrical surface forming portions 24 symmetrically face each other. The lower molds 2 are arranged symmetrically with respect to the center of the upper surface of the lower fixture 4, so that the first direction D1 in which the plurality of cylindrical surface forming portions 24 on the lower molds 2 extend radially extends from the center of the lower fixture 4.

As illustrated in FIG. 9, the lower fixture body 41 is formed into a cylindrical shape and includes a plurality of mounting through holes 411. Mounting steps 412 are formed on a lower portion of the mounting through holes 411. The lower mold 2 is arranged on the mounting through hole 411 in a state in which the lower mold flange portion 22 of the lower mold 2 is engaged with the mounting step 412. The lower mold 2 is installed on the lower fixture body 41 so that a tip of the lower mold 2 is inserted into the mounting through hole 411 from a lower side of the lower fixture body 41, and the lower mold flange portion 22 of the lower mold 2 engages with the mounting step 412. The lower mold 2 is installed on the lower fixture body 41 under a state in which the tip of the lower mold 2 protrudes from an upper surface of the lower fixture body 41. In this embodiment, the lower fixture body 41 is formed into a cylindrical shape, but the lower fixture body 41 is not limited to this shape and may be formed into, for example, a square column shape.

The lower fixture fixing plate 42 abuts against a lower edge portion of the lower fixture body 41 under a state in which a lower mold 2 is arranged in each of the plurality of mounting through holes 411. The lower fixture fixing plate 42 is fixed to the lower edge portion of the lower fixture body 41 via a screw portion 401.

As illustrated in FIG. 8B, it is possible to mount a plurality of the upper molds 3 onto the upper fixture 5 in a symmetrical manner. In this embodiment, four upper molds 3 are mounted to the upper fixture 5. The upper fixture 5 is arranged so as to face the lower fixture 4. The upper fixture 5 includes an upper fixture body 51, and an upper fixture fixing plate 52.

As illustrated in FIG. 9, the upper fixture body 51 is formed into a cylindrical shape and includes a plurality of mounting through holes 511. The mounting steps 512 are formed on an upper portion of the mounting through holes 511. The upper mold 3 is arranged on the mounting through hole 511 in a state in which an upper mold flange portion 32 of the upper mold 3 is engaged with the mounting step 512. The upper mold 3 is installed on the upper fixture body 51 so that a tip of the upper mold 3 is inserted into the mounting through hole 511 from an upper side of the upper fixture body 51, and the upper mold flange portion 32 of the upper mold 3 engages with the mounting step 512. The upper mold 3 is installed on the upper fixture body 51 under a state in which the tip of the upper mold 3 protrudes from an upper surface of the upper fixture body 51. In this embodiment, the upper fixture body 51 is formed into a cylindrical shape, but the upper fixture body 51 is not limited to this shape and may be formed into, for example, a square column shape.

The upper fixture fixing plate 52 abuts against an upper edge portion of the upper fixture body 51 under a state in which an upper mold 3 is arranged in each of the plurality of mounting through holes 511. The upper fixture fixing plate 52 is fixed to the upper edge portion of the upper fixture body 51 via the screw portion 501.

In the molding fixture 10 configured as described above, the mounting positions of the lower fixture 4 and the upper fixture 5 are made to coincide so that the respective positions of each of the plurality of lower molds 2 and the plurality of upper molds 3 coincide when the press molding 200 is molded. As a result, during one-press molding, a plurality of press moldings 200 can be formed using a plurality of the molds 1 for molding a lens.

According to the manufacturing method for a cylindrical lens 300 according to the above-mentioned second embodiment, the following effects can be achieved. The manufacturing method for a cylindrical lens 300 according to the second embodiment includes a step of making the mounting positions of the lower fixture 4 and the upper fixture 5 coincide so that the respective positions of each of the plurality of lower molds 2 and the plurality of upper molds 3 coincide, to thereby, during one-press molding, form a plurality of press moldings 200 using a plurality of the molds 1 for molding a lens. Therefore, a plurality of press moldings 200 can be formed using a plurality of the molds 1 for molding a lens. Therefore, mass productivity of the cylindrical lenses 300 can be further improved.

The present invention is not limited to the various embodiments described above, and changes or improvements within the scope that allows the object of the present invention to be achieved are included in the scope of the present invention. For example, in the above-mentioned second embodiment, four lower molds 2 are mounted to the lower fixture 4, and four upper molds 3 are mounted to the upper fixture 5, but the configuration is not limited thereto. For example, one, two, three, or five or more lower molds 2 may be mounted to the lower fixture 4, and one, two, three, or five or more upper molds 3 may be mounted to the upper fixture 5.

EXPLANATION OF REFERENCE NUMERALS 1 lens forming mold
2 lower mold (first mold)
3 upper mold (second mold)
4 lower fixture (first fixture)
5 upper fixture (second fixture)
24 cylindrical surface forming portion
24a top portion
25 inter-curved-surface flat surface forming portion (first flat surface forming portion)
27 mark forming recess portion (mark forming portion)
33 upper mold lower surface portion (second flat surface forming portion)
100, 100A, 100B, 100C, 100D glass material
101 convex portion
111 hole
121 hole
200 press molding (molding)
224 cylindrical surface
227 mark protrusion (mark)
300 cylindrical lens

What is claimed is:

1. A manufacturing method for a plurality of cylindrical lenses using a lens forming mold for forming, from a glass material formed into a circular plate shape, a molding on which a plurality of cylindrical surfaces are arranged in parallel, the lens forming mold comprising:
a first mold comprising: a plurality of cylindrical surface forming portions that are arranged in parallel at equal intervals; and a first flat surface forming portion that is provided between adjacent cylindrical surface forming portions; and
a second mold comprising a second flat surface forming portion that sandwiches the glass material and faces the plurality of cylindrical surface forming portions and the first flat surface forming portion of the first mold when the molding is molded,
wherein the first mold and the second mold are each formed into a cylindrical shape that has a circular molding surface,
the method comprising the steps of:
placing a glass material formed into a circular plate shape on the first mold and joining the first mold and the second mold to thereby form, without performing centering, a molding on which a plurality of cylindrical surfaces are arranged in parallel; and
cutting the molding with a cutting tool in two directions, the two directions being a direction in which the plurality of cylindrical surfaces are arranged and a direction that intersects with the direction in which the plurality of cylindrical surfaces are arranged, to thereby obtain the plurality of cylindrical lenses from one molding.

2. The manufacturing method for cylindrical lenses according to claim 1, wherein:
the manufacturing method uses a first fixture with which it is possible to mount a plurality of the first molds in a symmetrical manner, and a second fixture with which it is possible to mount a plurality of the second molds in a symmetrical manner; and
the manufacturing method includes a step of making mounting positions of the first fixture and the second fixture coincide, so that the respective positions of each of the plurality of first molds and the plurality of second molds coincide, to thereby, during one-press molding, form a plurality of moldings using a plurality of lens forming molds.

3. The manufacturing method for cylindrical lenses according to claim 1, wherein the glass material is formed into a circular plate shape and includes a protrusion that corresponds to a shape of the cylindrical surface forming portion of the first mold.

4. The manufacturing method for cylindrical lenses according to claim 1, wherein the glass material is formed into a circular plate shape and includes one or more holes or a vortex structure.

5. The manufacturing method for cylindrical lenses according to claim 1, wherein the glass material has: a diameter equal to or larger than a distance between both ends of the cylindrical surface forming portion; a surface area equal to or less than a surface area of the first mold; a volume equal to or less than a volume of the molding; and a thickness equal to or less than a thickness of the molding, and the glass material is formed so as to not protrude from the first mold and the second mold when the first mold and the second mold are joined.

6. The manufacturing method for cylindrical lenses according to claim 1, wherein each of the plurality of cylindrical surface forming portions of the first mold is configured of a spherical surface or a free-form surface, and
wherein top portions of each of the plurality of cylindrical surface forming portions are positioned on the same flat plane at the same height.

7. The manufacturing method for cylindrical lenses according to claim 1, wherein the first flat surface forming portion has a width that is equal to or larger than a thickness of a blade of a cutting tool that cuts the molding, and
wherein, on each end of the first mold, there is provided a mark forming portion for forming, on the molding, a mark that is used as a guide for positioning when cutting the molding with the cutting tool.

* * * * *